United States Patent [19]

Hooper

[11] 4,283,852
[45] Aug. 18, 1981

[54] GLASS CUTTER WITH ATTACHMENT

[76] Inventor: Orville D. Hooper, 3130 Sapp Rd., Tumwater, Wash. 98502

[21] Appl. No.: 65,976

[22] Filed: Aug. 13, 1979

[51] Int. Cl.³ .............................................. C03B 33/12
[52] U.S. Cl. ................................................. 30/164.95
[58] Field of Search .................. 30/164.9, 164.95, 295

[56] References Cited

U.S. PATENT DOCUMENTS

| 492,409 | 2/1893 | May | 30/295 |
|---|---|---|---|
| 734,909 | 7/1903 | MacLean | 30/295 |
| 1,750,577 | 3/1930 | DeBracht | 30/295 |
| 2,892,291 | 6/1959 | Coleman | 30/164.95 |

Primary Examiner—Jimmy C. Peters
Attorney, Agent, or Firm—Seed, Berry, Vernon & Baynham

[57] ABSTRACT

A standard glass cutter is provided with an attachment mounted on the back of the head so that the cutter can be held such as to be operated by pushing in the direction away from the operator.

7 Claims, 5 Drawing Figures

U.S. Patent    Aug. 18, 1981    4,283,852
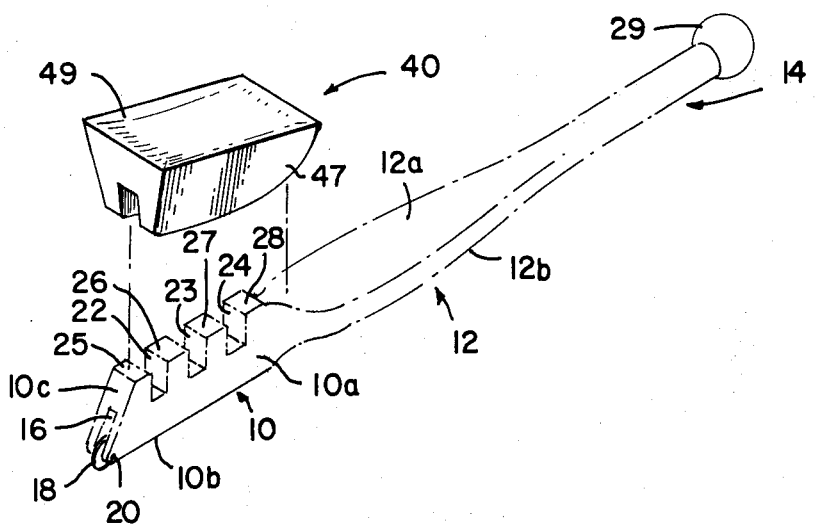
FIG. 2
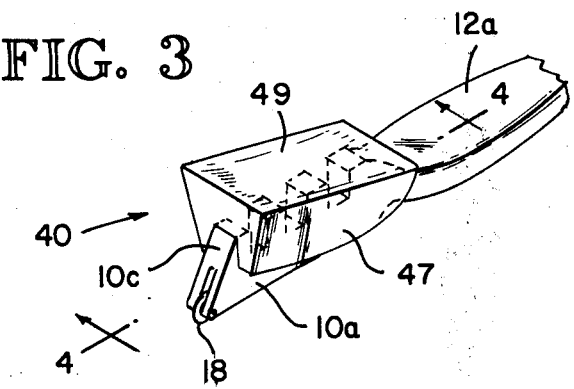
FIG. 3
FIG. 1
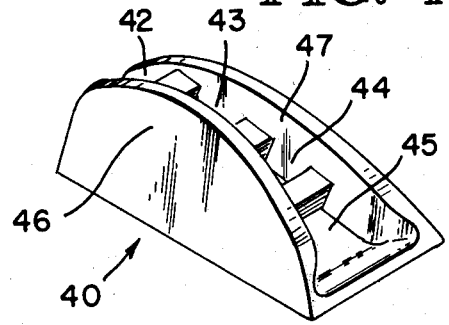
FIG. 4
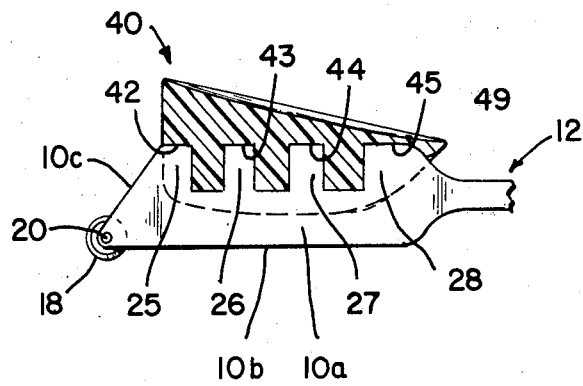
FIG. 5
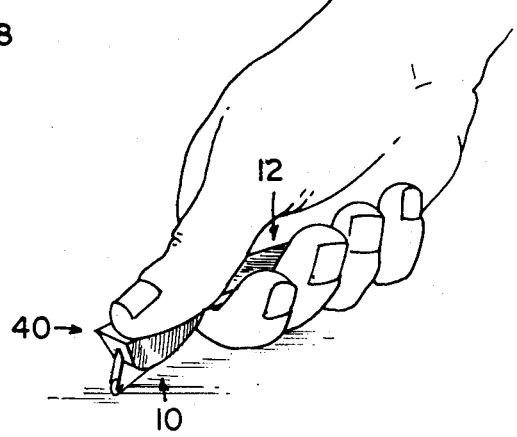

GLASS CUTTER WITH ATTACHMENT

BACKGROUND OF THE INVENTION

The present invention relates to glass cutters of the type in which a glass scoring wheel is mounted in the end of a handle.

In the past glass cutters have been gripped between the thumb and index finger with the cutter handle situated between the index and middle fingers, and the cutter operated by pulling it in the direction of the operator's body. When used in this manner it is difficult for even a skilled operator to follow a predefined, fairly intricate score path.

SUMMARY OF THE INVENTION

The present invention aims to provide an improved glass cutter which can more easily be used to accurately follow a desired score path.

Further objects are to provide a glass cutter that can be used either in the conventional manner or in an improved manner and to provide an attachment for conventional glass cutters to convert them to cutters which can be used in either manner.

Another aim is to provide such an attachment which is of particularly simple and economical construction and can be easily installed and removed so that the cutouts commonly provided on the back of the cutter head for aid in severing border glass portions can be used if desired.

In carrying out the foregoing objects there is provided an attachment which interfits with the back of the head of the conventional cutter and provides a top thumb grip at the cutter head whereby the cutter may be easily gripped between a thumb and index finger and operated by being pushed away from the operator's body while guided by both hands rather than being pulled toward the operator's body as in the past.

BRIEF DESCRIPTION OF THE DRAWINGS

In the accompanying drawings:

FIG. 1 is a perspective view of the attachment as seen from the upper side looking forward;

FIG. 2 is an exploded perspective view showing a standard glass cutter and the attachment in juxtaposition;

FIG. 3 is a perspective view showing the head of the cutter with the attachment in place;

FIG. 4 is a longitudinal sectional view taken as indicated by line 4—4 in FIG. 3; and FIG. 5 is a perspective view showing the cutter with the attachment in place and the new manner of holding the cutter.

DETAILED DESCRIPTION OF THE PREFERRED EMBODIMENTS

The body of a typical glass cutter to which the present invention is directed has an elongated head 10 at the forward end with flat side cheeks 10a, 10b and a handle formed with a central grip section 12 and a stem 14 at the rear. In side view the cutter head 10 has a flat bottom wall 10b joined at the front at an acute angle by a sloped forward wall 10c. The juncture portion between these walls 10b, 10c is centrally slotted at 16 to receive a small cutting wheel 18 which is journaled on a cross-pin 20 bridging the slot 16 between the cheeks 10a, 10b.

It will be noted that the top wall of the cutter head 10 is generally parallel with the bottom wall 10b and is formed with three rectangular notches 22–24 between four lands 25–28, the cutouts being progressively wider in width. The function of each cutout is to receive the edge portion of a glass sheet of approximately corresponding thickness which is to be broken.

In plan view the central grip section 12 bulges at the sides from the rear of the head section at rounded shoulder portions and then gradually tapers inwardly to the stem 14 which becomes round in cross-section and may have aterminal ball portion 29. When viewed from the side, the central grip section 12 necks inwardly symmetrically from the top and bottom walls of the head section to a thickness slightly less than the stem diameter and then gradually expands to the stem diameter. The result is that the grip section 12 provides a pair of like upper and lower grip faces 12a, 12b. Traditionally, the cutter has been held with the stem between the index and middle fingers and with the index finger seated on the top grip 12a and the thumb seated against the bottom grip 12b. The glass to be cut was then scored by pulling the hand holding the cutter in the body direction.

In accordance with the present invention there is provided a grip attachment 40 which interfits with the cutter head 10 to assume a position at the top thereof. The interfit with the cutter head is accomplished by forming the grip attachment with four sockets 42–45 shaped to receive the lands 25–28 and by providing the grip attachment with a pair of parallel side jaws 46,47 separated by a channel beneath the mouths of the sockets 42–45. At the top, the grip attachment is widened by tapering the jaws 46,47 and the upper surface is preferably made slightly concave to provide a thumb grip surface 49. This thumb grip surface 49 slopes upwardly from the rear of the attachment to the front such that when the cutter handle is sloping upwardly to the rear when the cutter is in cutting position with the attachment in position as shown in FIG. 5, the surface 49 still has a slight upward slope toward the front to resist forward sliding of a thumb bearing on the surface 49 and being pushed forwardly.

To use the cutter with the attachment in operative position, the cutter is gripped in one hand by positioning the index finger of the gripping hand laterally beneath the handle and resting against the lower grip face 12b and placing the thumb longitudinally upon the grip surface 49 of the attachment. The stem of the cutter is then lightly gripped in the palm by the other three fingers. It is preferred that the other hand is then positioned so that its thumb rests part way on the grip surface 49 forwardly of the other thumb and its index finger rests against the side of the attachment. Then to score a glass sheet with the cutter wheel the cutter is pushed away from the body and guided by both hands while pressing downwardly on the attachment. It has been determined that in this manner it is usually found to be easier to score along a curved path, particularly if it is quite intricate, than to use the cutter to score in the conventional manner.

It is important to note that while the attachment is in place it does not interfere with conventional use of the cutter for scoring. Hence, if providing of the notches 22–24 is not desired, the attachment can be made a permanent part of the cutter.

I claim:

1. A glass cutter comprising:

a body having an elongated head at the front, a central grip section and a stem at the rear, said head having a rectangular notch at the top for receiving the edge of a glass pane;

a glass scoring wheel mounted at the front end of the elongated head to extend below and to the front of such head;

said central grip section being shaped to be gripped in a hand between the thumb at the bottom side and index finger at the top side with the stem between the index and middle fingers when the glass cutter is to be operated by pulling it in the rearward direction; and a detachable attachment formed with a bottom channel fitting over said head and having a raised portion in said channel fitting into said notch, said attachment being formed with an upwardly facing thumb grip arranged to have a thumb bear thereagainst with the adjoining index finger resting against the underside of said central grip section when the glass cutter is to be operated by pushing it in the forward direction.

2. A glass cutter according to claim 1 in which said thumb grip is dished and slopes upwardly toward the front of the elongated head.

3. A glass cutter according to claim 1 in which the top of said elongated head has a series of lands and notches, and in which said channel has a series of raised portions therein fitting into said notches.

4. An attachment for a glass cutter of the type having an elongated flat-sided head at the front which has a glass scoring wheel and is notched at the top to provide a series of notches and lands, a central grip section for receiving a thumb on the underside and the adjoining index finger at the top side when the cutter is to be operated by pulling it to the rear, and a rear stem, said attachment comprising:

an attachment body formed with an upper thumb grip and having its underside shaped to interfit with said elongated head and formed at the bottom with sockets adapted to interfit with said lands, said body being for use when it is desired to operate the cutter by pushing it forwardly, in which case the glass cutter and attachment as an assembly is adapted to be held with a thumb bearing against the thumb grip and the adjoining index finger resting against the underside of the central grip section.

5. An attachment according to claim 4 in which the attachment body is also formed at the bottom with a channel corresponding in width to the width of said elongated head between its flat sides whereby the attachment will interfit with said flat sides.

6. An attachment according to claim 5 in which the upper thumb grip of the attachment slopes upwardly in forward direction relative to said channel.

7. An attachment according to claim 4 in which the upper thumb grip of the attachment slopes upwardly toward the front.

* * * * *